(12) United States Patent
Hall et al.

(10) Patent No.: US 6,885,504 B2
(45) Date of Patent: Apr. 26, 2005

(54) METHOD FOR THE DESIGN AND FABRICATION OF COMPLEMENTARY OPTICAL COMB FILTER PAIRS

(75) Inventors: Randolph L. Hall, Newbury Park, CA (US); William H. Southwell, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 857 days.

(21) Appl. No.: 09/878,816

(22) Filed: Jun. 11, 2001

(65) Prior Publication Data

US 2002/0186473 A1 Dec. 12, 2002

(51) Int. Cl.[7] .............................................. G02B 1/10
(52) U.S. Cl. ...................... 359/580; 359/589; 359/590; 359/900
(58) Field of Search ................................ 359/580, 589, 359/590, 900, 359

(56) References Cited

U.S. PATENT DOCUMENTS

| | | | |
|---|---|---|---|
| 4,227,208 A | | 10/1980 | Takanashi et al. |
| 4,913,934 A | * | 4/1990 | Sharp et al. .............. 427/163.1 |
| 5,170,290 A | | 12/1992 | Land et al. |
| 5,225,930 A | | 7/1993 | Land et al. |
| 5,281,960 A | | 1/1994 | Dwyer, III |
| 5,457,760 A | | 10/1995 | Mizrahi |
| 5,949,562 A | | 9/1999 | Kubota et al. |
| 6,023,357 A | | 2/2000 | Miyasita |

* cited by examiner

*Primary Examiner*—Fayez G. Assaf
(74) *Attorney, Agent, or Firm*—Harness Dickey & Pierce P.L.C.

(57) ABSTRACT

A complementary comb filter pair, and method for making same, are described, wherein each comb filter element of the complementary pair can be fabricated during the same deposition run. The complementary comb filter is masked so as to retard the thin film growth of the coating, for example, a dielectric material, so as to produce a desired wavelength transmission profile.

21 Claims, 2 Drawing Sheets

METHOD FOR THE DESIGN AND FABRICATION OF COMPLEMENTARY OPTICAL COMB FILTER PAIRS

GOVERNMENT RIGHTS STATEMENT

This invention was made with Government support under Contract Nos. F33615-92-C-9501 and F33615-91-C-5550 awarded by the United States Air Force. The Government has certain rights in this invention.

TECHNICAL FIELD

The present invention relates generally to optical comb filters, and more particularly to a new and improved complementary optical comb filter pair design and method for making the same.

BACKGROUND OF THE INVENTION

The human eye can only see that portion of the electromagnetic spectrum generally referred to as visible light (e.g., radiation having a wavelength of about 400 to about 700 nanometers). All other portions of the electromagnetic spectrum (e.g., near infrared radiation having a wavelength of about 700 nanometers to about 5000 nanometers) typically require some type of optical intervention and assistance in order to provide an image that the human eye can clearly discern.

Of particular interest are modern imaging technologies used for detecting objects in the infrared portion of the electromagnetic spectrum, especially the near infrared portion. These imaging technologies have particular application for uses such as night vision goggles (NVG's) and heads-up displays for the military, as well as civilian police departments. These devices are particularly useful for imaging objects at night when there is little or no visible light present; although there is an abundance of near infrared radiation available. The near infrared radiation emitted by an object is typically due to heat being radiated from the object (e.g., a human, an automobile, a tank, an airplane, and the like). Therefore, by way of a non-limiting example, police department helicopters can track a suspect who is fleeing from ground units at night due to the fact that the suspect, when viewed in the infrared spectrum, will appear to be "illuminated" (because he/she is radiating body heat) whereas the surrounding ground will appear "darkened" (because it is not radiating any significant amounts of heat).

In order for this night vision technology to achieve its intended function, it is generally recognized that some sort of filtering mechanism must be employed to block out those parts of the electromagnetic spectrum that are undesired. Therefore, if the viewing device is intended to allow the operator to view objects in the near infrared portion of the electromagnetic spectrum, it would not make sense to allow visible light, ultraviolet light, or even mid-infrared and far-infrared light, to be transmitted through the filtering mechanism. If this were to happen, the resolution of the resulting image would be compromised. According, many night vision viewing devices employ some sort of infrared filter mechanism to only allow a specific wavelength range (or ranges) of near infrared light to be transmitted through the filter mechanism.

One type of optical filter that has been used for night vision filter applications is generally referred to as a comb filter. A comb filter generally consists of a thin, flat plate of a transparent anisotropic substance (e.g., glass or polymer substrate) coated (e.g., by vacuum deposition, ion sputtering, and so forth) with a thin interference film of dielectric material (e.g., an oxide such as silicon dioxide or titanium dioxide). The dielectric coating permits certain wavelengths bands to pass through the substrate, while other wavelengths bands are reflected. Therefore, a comb filter typically consists of many alternating "pass" bands, where the light wavelength is transmitted and "stop" bands, where the light wavelength is not transmitted (i.e., reflected), thus giving a typical comb filter transmittance plot a "spiky" appearance, not unlike the teeth of a hair comb.

Of particular interest are rugate coatings which are generally defined as optical interference films wherein the refractive index of the film continuously and periodically grades as a function of the film's optical thickness.

A special type of comb filter system consists of a pair of complementary comb filters. By "complementary" it is meant that the pass and stop bands of the first comb filter are reversed on the second comb filter. Thus, a complementary pair of comb filters has the property that one comb filter blocks light wavelengths that are transmitted by the other comb filter, and vice versa. In this manner, a greater number of highly discrete and desirable light wavelengths can be transmitted with a complementary comb filter pair than with only a single comb filter.

Typically, each comb filter of the complementary pair is fabricated in its' own separate deposition run, where thin film growth of the dielectric material takes place to a specific pre-determined thickness, as in the case of rugate coatings, in order to produce a specific wavelength transmittance profile for that particular comb filter. Because of the requirement to match all of the band wavelength positions on both filters, the fabrication of complementary comb filter pairs is extremely difficult. For example, the deposition thickness and pattern of the thin films of the respective comb filters may have been improperly done, and therefore, the overall combined transmittance profile of the complementary pair is thus unacceptable. This problem leads to increased material costs due to rejected comb filters, delays in manufacturing, and increased labor costs.

Therefore there exists a need for new and improved complementary comb filter pairs, and simple, inexpensive, and accurate methods for making same.

SUMMARY OF THE INVENTION

It is therefore a principal object of this invention to provide a new and improved comb filter and method of making same.

It is another object of this invention to provide a new and improved comb filter pair and method of making same.

It is another object of this invention to provide a new and improved complementary comb filter pair and method of making same.

It is another object of this invention to provide a new and improved method for making a complementary comb filter pair, wherein both of the comb filter elements have a thin film of dielectric material deposited thereon during the same deposition procedure.

It is another object of this invention to provide a new and improved method for making a complementary comb filter pair, wherein both of the comb filter elements have a thin film of dielectric material deposited thereon during the same deposition procedure, wherein one comb filter element is selectively provided with a masking agent to prevent deposition of the dielectric material in the area covered with the masking agent.

In accordance with a first embodiment of the present invention, a method for making a complementary comb filter pair is provided, wherein the complementary comb filter pair comprises:

a first comb filter element having at least one stop band having a center position and a second comb filter element having at least one stop band having a center position, wherein the complementary comb filter pair is to be used to filter electromagnetic radiation having a wavelength range, comprising:

determining a constant multiplicitive factor M, according to the formula $M^{2n}=\lambda_{short}/\lambda_{long}$;

wherein n is the number of stop bands of each comb filter of the complementary comb filter pair, $\lambda_{short}$ is the shortest wavelength of the wavelength range and $\lambda_{long}$ is the longest wavelength of the wavelength range.

In accordance with a second embodiment of the present invention, a method for making a complementary comb filter pair is provided, wherein the complementary comb filter pair comprises a first comb filter element having at least one stop band having a center position and a second comb filter element having at least one stop band having a center position, wherein the complementary comb filter pair is to be used to filter electromagnetic radiation having a wavelength range, comprising:

determining a constant multiplicitive factor M, according to the formula $M^{2n}=\lambda_{short}/\lambda_{long}$;

wherein n is the number of stop bands of each comb filter of the complementary comb filter pair, $\lambda_{short}$ is the shortest wavelength of the wavelength range and $\lambda_{long}$ is the longest wavelength of the wavelength range; and calculating the center position of the stop band of the first comb filter element having the longest wavelength according to the formula $\lambda_a=\lambda_{long}2M/(M+1)$;

wherein $\lambda_a$ is the center position of the stop band of the first comb filter element having the longest wavelength, $\lambda_{long}$ is the longest wavelength of the wavelength range, and M is the constant multiplicitive factor.

In accordance with a third embodiment of the present invention, a method for making a complementary comb filter pair is provided, wherein the complementary comb filter pair comprises a first comb filter element having at least one stop band having a center position and a second comb filter element having at least one stop band having a center position, wherein the complementary comb filter pair is to be used to filter electromagnetic radiation having a wavelength range, comprising:

determining a constant multiplicitive factor M, according to the formula $M^{2n}=\lambda_{short}/\lambda_{long}$;

wherein n is the number of stop bands of each comb filter of the complementary comb filter pair, $\lambda_{short}$ is the shortest wavelength of the wavelength range and $\lambda_{long}$ is the longest wavelength of the wavelength range;

calculating the center position of the stop band of the first comb filter element having the longest wavelength according to the formula $\lambda_a=\lambda_{long}2M/(M+1)$;

wherein $\lambda_a$ is the center position of the stop band of the first comb filter element having the longest wavelength, $\lambda_{long}$ is the longest wavelength of the wavelength range, and M is the constant multiplicitive factor; and calculating the center position of the stop band of the second comb filter element having the longest wavelength according to the formula $\lambda_b=\lambda_a M$;

wherein $\lambda_b$ is the center position of the stop band of the second comb filter element having the longest wavelength, $\lambda_a$ is the center position of the stop band of the first comb filter element having the longest wavelength, and M is the constant multiplicitive factor.

These and other objects, advantages and novel features of the present invention will become apparent from the following detailed description of the invention when considered in conjunction with the accompanying drawing.

BRIEF DESCRIPTION OF THE DRAWINGS

The present invention will become more fully understood from the detailed description and the accompanying drawing, wherein.

The same elements or parts throughout the figures are designated by the same reference of characters.

DETAILED DESCRIPTION OF THE PREFERRED EMBODIMENTS

Figure 1:
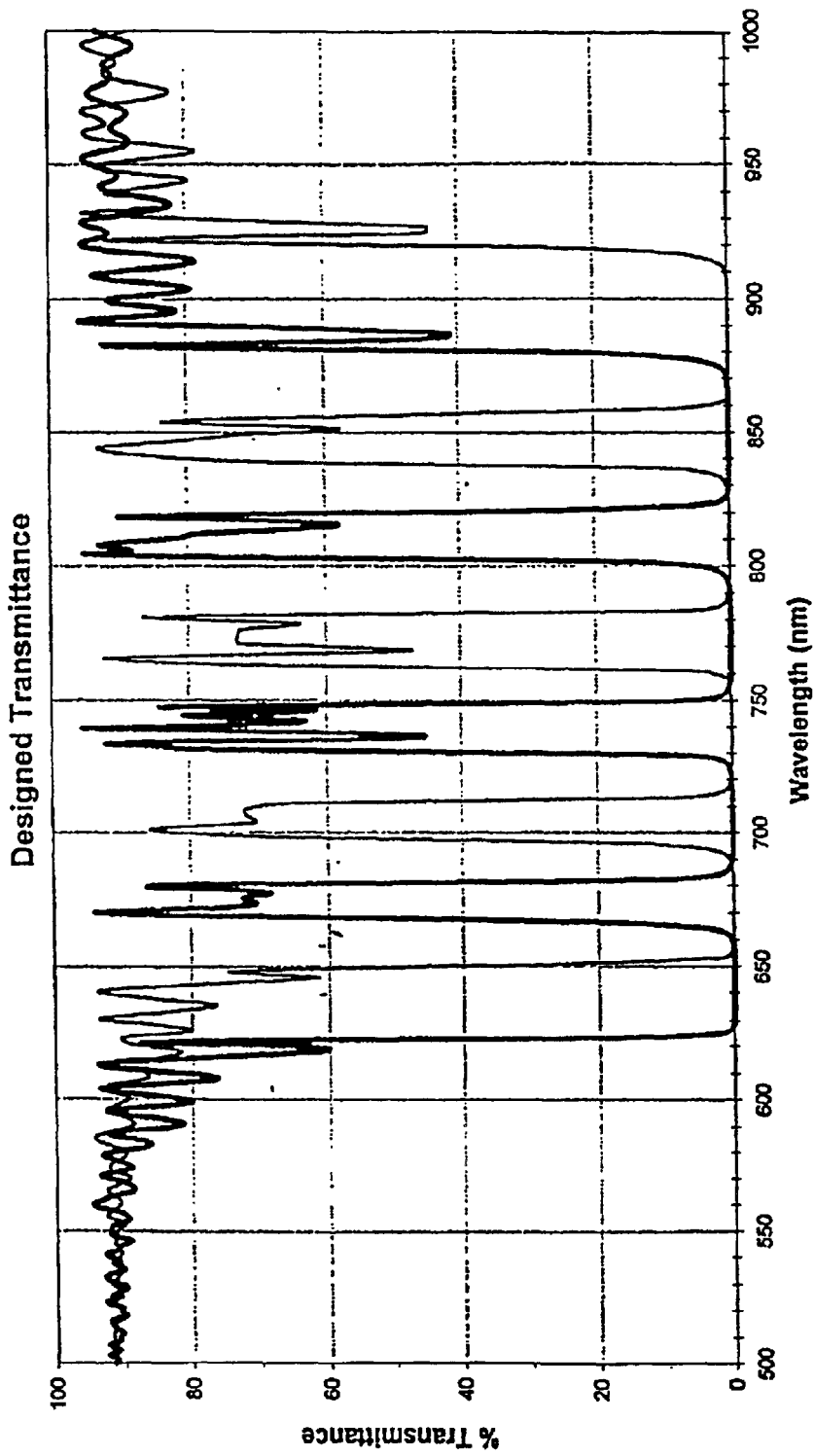
FIG. 1 is a graphical illustration of a designed transmittance plot, in accordance with one embodiment of the present invention.

The present invention employs a specially designed masking system to selectively retard thin film growth on one member of the complementary comb filter pair so that in the same deposition run all of the stop bands of one filter are shifted in wavelength relative to the other filter by just the amount necessary to generate the complementary filter. Accordingly, those portions of the filter that are covered with the masking agent receive less deposition of the dielectric material, and consequently, the spectral features are correspondingly shifted to shorter wavelengths. With careful design, the stop bands of the second filter shift just over the pass bands of the first filter. Thus, the present invention has eliminated the need for separate deposition runs and has relaxed the tolerances that would have been necessary to fabricate the second filter to match the first filter.

The design of the complementary comb filter pair of the present invention requires some initial attention and planning in order to optimize the results.

The first step is to identify the wavelengths for the centers of the rugate stop bands that comprise the desired transmittance plot or profile of the complementary comb filter pair. In this example, there are eight stop bands; however, it is contemplated that either less than or more than this number of stop bands may be practiced with the present invention. These wavelengths are then denoted, from longest to the shortest, $\lambda_a$, $\lambda_b$, $\lambda_c$, $\lambda_d$, $\lambda_e$, $\lambda_f$, $\lambda_g$, $\lambda_h$, and so forth, wherein $\lambda_a$, $\lambda_c$, $\lambda_e$, $\lambda_g$, and so forth are rugate line positions on one filter and $\lambda_b$, $\lambda_d$, $\lambda_f$, $\lambda_h$, and so forth are the rugate line positions on the complementary filter.

It is important to recognize that the wavelength separation of these lines will not be constant, nor will it be constant in wavenumber, as one of ordinary skill in the art might have incorrectly supposed. Rather, these line positions must be determined such that each wavelength is transformed to that of its neighbor by a constant multiplicitive factor, denoted by the symbol M.

Thus, $\lambda_b$ will be equal to $\lambda_a$ times M, $\lambda_c$ will be equal to $\lambda_b$ times M, $\lambda_d$ will be equal to $\lambda_c$ times M, $\lambda_e$ will be equal to $\lambda_d$ times M, and $\lambda_f$ will be equal to $\lambda_e$ times M.

Furthermore, it can also be shown that the shortest wavelength, $\lambda_{short}$, must be equal to $\lambda_{long}M^{2n}$, wherein n is the number of rugate lines in each filter and $\lambda_{long}$ is the longest wavelength of interest. This equation also aids in the determination of M. Thus, we have $M^{2n}=\lambda_{short}/\lambda_{long}$. Next, $\lambda_a$ must be determined, then with M all other rugate line positions for both complementary filters can be determined. This information is obtained from the knowledge that a rugate (or a quarterwave) stop band is not symmetrical in wavelength, but is symmetrical in wavenumber. This information is important to get the band edges of the rugate lines to properly adjoin itself and its' neighbor in the complementary filter. Accordingly, the following equation is thus obtained, $\lambda_a=\lambda_{long}2M/(M+1)$. The other wavelengths are then determined from, $\lambda_b=\lambda_aM$; $\lambda_c=\lambda_bM$; $\lambda_d=\lambda_cM$; $\lambda_e=\lambda_dM$; and $\lambda_f=\lambda_eM$; Accordingly, by knowing M, only one filter design is required because 1-M is the masking factor or the difference in deposition thickness for one set of filters from the other. Thus, by knowing M, a suitable masking agent can be applied to the complementary comb filter prior to deposition of the dielectric material so as to retard the thin film growth by the masking factor described above.

To illustrate the usefulness of the present invention, consider the following example wherein a complementary optical comb filter pair is to be designed for a wavelength spectrum of 700 nanometers to 1000 nanometers, with each comb filter having four stop bands. The centers of the stop bands of the first comb filter are denoted, from longest to shortest, as $\lambda_a$, $\lambda_c$, $\lambda_e$, $\lambda_g$, respectively, and the centers of the stop bands of the second or complementary comb filter are denoted, from longest to shortest, as $\lambda_b$, $\lambda_d$, $\lambda_f$, $\lambda_h$, respectively.

As previously described, M must be determined according to the formula $M^{2n}=\lambda_{short}/\lambda_{long}$. Performing the calculations results in $M^{2(4)}=700/1000$, which is equivalent to $M^8=0.7$, which finally results in 0.956395, which is the constant multiplicitive factor, M. Furthermore, the masking factor or the difference in deposition thickness for one set of filters from the other can now be determined by the formula 1-M. In this example, 1-0.956395 results in 0.043605.

Once M has been determined, $\lambda_a$ must then be determined according to the formula, $\lambda_a=\lambda_{long}2M/(M+1)$. Performing the calculations results in $\lambda_a=(1000\times2(0.956395))/(0.956395+1)$, which is equivalent to 1912.79/1.95639, which results in 977.7, which is the center position, expressed in nanometers, of the first rugate stop band (i.e., $\lambda_a$) of the first comb filter. With this information, the other center positions of the other stop bands can now be calculated.

Once $\lambda_a$ has been determined, $\lambda_b$ can now be determined according to the formula, $\lambda_b=\lambda_aM$. Performing the calculations results in $\lambda_b=(977.7)(0.956395)$, which results in 935, which is the center position, expressed in nanometers, of the first rugate stop band (i.e., $\lambda_b$) of the second or complementary comb filter.

Once $\lambda_b$ has been determined, $\lambda_c$ can now be determined according to the formula, $\lambda_c=\lambda_bM$. Performing the calculations results in $\lambda_c=(935)(0.956395)$, which results in 894, which is the center position, expressed in nanometers, of the second rugate stop band (i.e., $\lambda_c$) of the first comb filter.

Once $\lambda_c$ has been determined, $\lambda_d$ can now be determined according to the formula, $\lambda_d=\lambda_cM$. Performing the calculations results in $\lambda_d=(894)(0.956395)$, which results in 855, which is the center position, expressed in nanometers, of the second rugate stop band (i.e., $\lambda_d$) of the second or complementary comb filter.

Once $\lambda_d$ has been determined, $\lambda_e$ can now be determined according to the formula, $\lambda_e=\lambda_dM$. Performing the calculations results in $\lambda_e=(855)(0.956395)$, which results in 817.7, which is the center position, expressed in nanometers, of the third rugate stop band (i.e., $\lambda_e$) of the first comb filter.

Once $\lambda_e$ has been determined, $\lambda_f$ can now be determined according to the formula, $\lambda_f=\lambda_eM$. Performing the calculations results in $\lambda_f=(817.7)(0.956395)$, which results in 782, which is the center position, expressed in nanometers, of the third rugate stop band (i.e., $\lambda_f$) of the second or complementary comb filter.

Once $\lambda_f$ has been determined, $\lambda_g$ can now be determined according to the formula, $\lambda_g=\lambda_fM$. Performing the calculations results in $\lambda_g=(782)(0.956395)$, which results in 748, which is the center position, expressed in nanometers, of the fourth rugate stop band (i.e., $\lambda_g$) of the first comb filter.

Once $\lambda_g$ has been determined, $\lambda_h$ can now be determined according to the formula, $\lambda_h=\lambda_gM$. Performing the calculations results in $\lambda_h=(748)(0.956395)$, which results in 716, which is the center position, expressed in nanometers, of the fourth rugate stop band (i.e., $\lambda_h$) of the second or complementary comb filter.

As previously predicted, the wavelength separation of these lines was not be constant, nor were they constant in wavenumber.

Thus, all of the center positions of all of the rugate stop bands of the comb filters of the complementary pair can be easily determined, in accordance with the general teachings of the present invention. Once this is known, as well as the constant multiplicitive factor M, the complementary comb filter can be masked and coated with the dielectric material to a specific predetermined depth so as to cause the specific wavelength shift desired, while the other comb filter is also being fabricated during the same deposition run.

Figure 2:
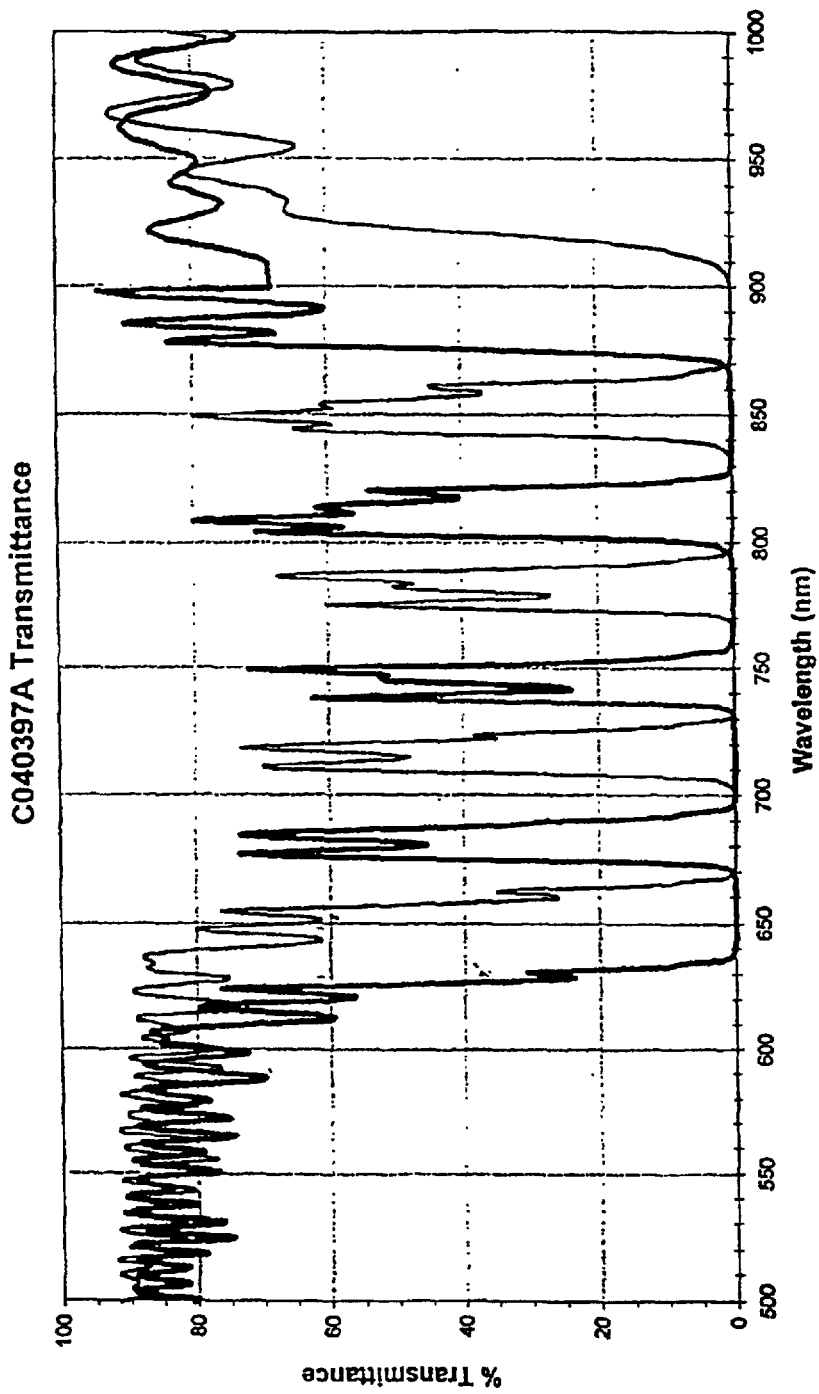
FIG. 2 is a graphical illustration of an actual transmittance plot, in accordance with one embodiment of the present invention.

In practice, mask precision is greater than wavelength precision, thus the complementary feature is maintained when band positions are off target. Thus, yields of complementary filter pairs are significantly higher with this approach. FIG. 2 illustrates a transmittance plot of a complementary comb filter pair, prepared in accordance with the general teachings of the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for making a complementary comb filter pair, wherein the complementary comb filter pair comprises a first comb filter element having at least one stop band having a center position and a second comb filter element having at least one stop band having a center position, wherein the complementary comb filter pair is to be used to filter electromagnetic radiation having a wavelength range, comprising:

determining a constant multiplicitive factor M, according to the formula $M^{2n}=\lambda_{short}/\lambda_{long}$;

wherein n is the number of stop bands of each comb filter of the complementary comb filter pair, $\lambda_{short}$ is the shortest wavelength of the wavelength range and $\lambda_{long}$ is the longest wavelength of the wavelength range.

2. A product prepared in accordance with the method of claim 1.

3. The invention according to claim 1, wherein the first comb filter element has a first wavelength transmission profile and the second comb filter element has a second wavelength transmission profile, wherein the first wavelength transmission profile is complementary to the second wavelength transmission profile.

4. The invention according to claim 1, wherein the center position of the stop band of the first comb filter element having the longest wavelength is calculated according to the formula $\lambda_a=\lambda_{long}2M/(M+1)$, wherein $\lambda_a$ is the center position of the stop band of the first comb filter element having the longest wavelength, $\lambda_{long}$ is the longest wavelength of the wavelength range, and M is the constant multiplicitive factor.

5. The invention according to claim 4, wherein the center position of the stop band of the second comb filter element having the longest wavelength is calculated according to the formula $\lambda_b=\lambda_a M$, wherein $\lambda_b$ is the center position of the stop band of the second comb filter element having the longest wavelength, $\lambda_a$ is the center position of the stop band of the first comb filter element having the longest wavelength, and M is the constant multiplicitive factor.

6. The invention according to claim 1, wherein a masking agent is disposed on at least a portion of a surface of the second comb filter element.

7. The invention according to claim 1, wherein a dielectric coating is disposed on at least a portion of a surface of the first and second comb filter elements.

8. The invention according to claim 7, wherein the dielectric coating is disposed on the at least a portion of the surface of the first comb filter element to a first depth and the dielectric coating is disposed on the at least a portion of the surface of the second comb filter element to a second depth, wherein the difference in the deposition depth of the dielectric coating of the first comb filter element and the second filter element is calculated according to the formula 1-M, wherein M is the constant multiplicitive factor.

9. A method for making a complementary comb filter pair, wherein the complementary comb filter pair comprises a first comb filter element having at least one stop band having a center position and a second comb filter element having at least one stop band having a center position, wherein the complementary comb filter pair is to be used to filter electromagnetic radiation having a wavelength range, comprising:

determining a constant multiplicitive factor M, according to the formula $M^{2n}=\lambda_{short}/\lambda_{long}$;

wherein n is the number of stop bands of each comb filter of the complementary comb filter pair, $\lambda_{short}$ is the shortest wavelength of the wavelength range and $\lambda_{long}$ is the longest wavelength of the wavelength range; and calculating the center position of the stop band of the first comb filter element having the longest wavelength according to the formula $\lambda_a=\lambda_{long}2M/(M+1)$;

wherein $\lambda_a$ is the center position of the stop band of the first comb filter element having the longest wavelength, $\lambda_{long}$ is the longest wavelength of the wavelength range, and M is the constant multiplicitive factor.

10. A product prepared in accordance with the method of claim 9.

11. The invention according to claim 9, wherein the first comb filter element has a first wavelength transmission profile and the second comb filter element has a second wavelength transmission profile, wherein the first wavelength transmission profile is complementary to the second wavelength transmission profile.

12. The invention according to claim 9, wherein the center position of the stop band of the second comb filter element having the longest wavelength is calculated according to the formula $\lambda_b=\lambda_a M$, wherein $\lambda_b$ is the center position of the stop band of the second comb filter element having the longest wavelength, $\lambda_a$ is the center position of the stop band of the first comb filter element having the longest wavelength, and M is the constant multiplicitive factor.

13. The invention according to claim 9, wherein a masking agent is disposed on at least a portion of a surface of the second comb filter element.

14. The invention according to claim 9, wherein a dielectric coating is disposed on at least a portion of a surface of the first and second comb filter elements.

15. The invention according to claim 14, wherein the dielectric coating is disposed on the at least a portion of the surface of the first comb filter element to a first depth and the dielectric coating is disposed on the at least a portion of the surface of the second comb filter element to a second depth, wherein the difference in the deposition depth of the dielectric coating of the first comb filter element and the second filter element is calculated according to the formula 1-M, wherein M is the constant multiplicitive factor.

16. A method for making a complementary comb filter pair, wherein the complementary comb filter pair comprises a first comb filter element having at least one stop band having a center position and a second comb filter element having at least one stop band having a center position, wherein the complementary comb filter pair is to be used to filter electromagnetic radiation having a wavelength range, comprising:

determining a constant multiplicitive factor M, according to the formula $M^{2n}=\lambda_{short}/\lambda_{long}$;

wherein n is the number of stop bands of each comb filter of the complementary comb filter pair, $\lambda_{short}$ is the shortest wavelength of the wavelength range and $\lambda_{long}$ is the longest wavelength of the wavelength range;

calculating the center position of the stop band of the first comb filter element having the longest wavelength according to the formula $\lambda_a=\lambda_{long}2M/(M+1)$;

wherein $\lambda_a$ is the center position of the stop band of the first comb filter element having the longest wavelength, $\lambda_{long}$ is the longest wavelength of the wavelength range, and M is the constant multiplicitive factor; and calculating the center position of the stop band of the second comb filter element having the longest wavelength according to the formula $\lambda_b=\lambda_a M$;

wherein $\lambda_b$ is the center position of the stop band of the second comb filter element having the longest wavelength, $\lambda_a$ is the center position of the stop band of the first comb filter element having the longest wavelength, and M is the constant multiplicitive factor.

17. A product prepared in accordance with the method of claim 16.

18. The invention according to claim 16, wherein the first comb filter element has a first wavelength transmission profile and the second comb filter element has a second wavelength transmission profile, wherein the first wavelength transmission profile is complementary to the second wavelength transmission profile.

19. The invention according to claim 16, wherein a masking agent is disposed on at least a portion of a surface of the second comb filter element.

20. The invention according to claim 16, wherein a dielectric coating is disposed on at least a portion of a surface of the first and second comb filter elements.

21. The invention according to claim 20, wherein the dielectric coating is disposed on the at least a portion of the surface of the first comb filter element to a first depth and the dielectric coating is disposed on the at least a portion of the surface of the second comb filter element to a second depth, wherein the difference in the deposition depth of the dielectric coating of the first comb filter element and the second filter element is calculated according to the formula 1-M, wherein M is the constant multiplicitive factor.

* * * * *